US012223892B2

(12) United States Patent
Zeng et al.

(10) Patent No.: US 12,223,892 B2
(45) Date of Patent: Feb. 11, 2025

(54) PIXEL CIRCUIT AND DISPLAY PANEL

(71) Applicant: Wuhan China Star Optoelectronics Semiconductor Display Technology Co., Ltd., Wuhan (CN)

(72) Inventors: Mian Zeng, Wuhan (CN); Liang Sun, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,196

(22) PCT Filed: Dec. 17, 2021

(86) PCT No.: PCT/CN2021/139160

§ 371 (c)(1),
(2) Date: Dec. 27, 2021

(87) PCT Pub. No.: WO2023/103038

PCT Pub. Date: Jun. 15, 2023

(65) Prior Publication Data

US 2024/0046864 A1 Feb. 8, 2024

(30) Foreign Application Priority Data

Dec. 9, 2021 (CN) ......................... 202111498869.X

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0819* (2013.01); *G09G 2300/0842* (2013.01); *G09G 2300/0852* (2013.01); *G09G 2300/0861* (2013.01); *G09G 2310/08* (2013.01); *G09G 2320/0233* (2013.01); *G09G 2320/0247* (2013.01); *G09G 2320/045* (2013.01); *G09G 2340/0435* (2013.01)

(58) Field of Classification Search
CPC ...... G09G 3/32; G09G 3/3225; G09G 3/3233; G09G 2300/0819; G09G 2300/0842; G09G 2300/0852; G09G 2300/0861; G09G 2310/0251; G09G 2310/0262; G09G 2310/08; G09G 2320/0233; G09G 2320/0247; G09G 2320/045; G09G 2340/0435
See application file for complete search history.

(56) References Cited

FOREIGN PATENT DOCUMENTS

| | | |
|---|---|---|
| CN | 109087610 A | 12/2018 |
| CN | 109903724 A | 6/2019 |

(Continued)

*Primary Examiner* — Julie Anne Watko
(74) *Attorney, Agent, or Firm* — PV IP PC; Wei Te Chung

(57) ABSTRACT

Disclosed are a pixel circuit and a display panel. The pixel circuit includes a Light emitting device, a Data signal write-in module, a Driving transistor, a Compensation module, a First initialization module, and a Light emitting control module. The first initialization module is electrically connected to the compensation module and electrically connected to the gate of the driving transistor through the compensation module. When the voltage level of the gate of the driving transistor, the number of the transistors connected to the driving transistor could be reduced.

16 Claims, 6 Drawing Sheets

(56) References Cited

FOREIGN PATENT DOCUMENTS

| | | | | | |
|---|---|---|---|---|---|
| CN | 111341257 | A | | 6/2020 | |
| CN | 111739470 | A | | 10/2020 | |
| CN | 111754920 | A | | 10/2020 | |
| CN | 111986612 | A | | 11/2020 | |
| CN | 112382235 | A | | 2/2021 | |
| CN | 112562593 | A | | 3/2021 | |
| CN | 113035133 | A | | 6/2021 | |
| CN | 113314073 | A | * | 8/2021 | ........... G09G 3/3208 |
| CN | 113554988 | A | | 10/2021 | |
| JP | 2012141619 | A | | 7/2012 | |
| WO | WO-2021238470 | A1 | * | 12/2021 | ............... G09G 3/32 |

* cited by examiner

PIXEL CIRCUIT AND DISPLAY PANEL

CROSS-REFERENCE TO RELATED APPLICATION

This application is a national phase application under 35 U.S.C. § 371 of PCT Application No. PCT/CN2021/139160, filed Dec. 17, 2021, which claims priority to Chinese Application No. 202111498869.X, filed Dec. 9, 2021, the contents of which are incorporated herein by reference in their entirety.

FIELD OF THE DISCLOSURE

The present disclosure relates to a display technology, and more particularly, to a pixel circuit and a display panel.

BACKGROUND INFORMATION

Mini-LEDs (light emitting diode), micro-LEDs, and OLEDs (organic light emitting diode) have advantages of high luminance, high contrast and high color fields and are widely used in all kinds of high-performance displays.

In a conventional pixel circuit, the leakage phenomenon is serious. In the following light emitting process, the gate voltage level of the driving transistor changes because of leakage currents. This changes the luminance in one frame in a low-frequency driving, causes flickers and thus ruins the display quality of the display device.

SUMMARY

One objective of an embodiment of the present disclosure is to provide a pixel circuit and a display panel, to solve the issue of variances of the gate voltage of the driving transistor due to the leakage currents in the conventional pixel circuit.

According to an embodiment of the present disclosure, a pixel circuit is disclosed. The pixel circuit includes a light emitting device, a data signal write-in module, a driving transistor, a compensation module, a first initialization module, and a light emitting control module.

The light emitting device has two ends electrically connected to a first power signal and a second power signal. The data signal write-in module is configured to output a data signal in response to a first scan signal. The driving transistor has a first electrode electrically connected to the data signal write-in module. The compensation module is electrically connected to a second electrode of the driving transistor and a gate of the driving transistor. The compensation module is configured to receive a second scan signal and the first power signal. The first initialization module electrically connected to the compensation module, is configured to receive a third scan signal and a first initialization signal. The light emitting control module is connected in parallel between the first power signal and the second power signal and is configured to receive a light emitting control signal.

Optionally, the data signal write-in module comprises a first transistor, having a gate receiving the first scan signal, a first electrode receiving the data signal, and a second electrode electrically connected to the first electrode of the driving transistor.

Optionally, the compensation module comprises a first capacitor and a second transistor. The first capacitor has two ends electrically connected to the gate of the driving transistor and the first power signal. The second transistor has a gate receiving the second scan signal, a first electrode electrically connected to the gate of the driving transistor, and a second electrode electrically connected to the driving transistor.

Optionally, the first initialization module is electrically connected to the second electrode of the driving transistor.

Optionally, the second transistor is a double-gate transistor, having a first gate and a second gate both receiving the second scan signal.

Optionally, the pixel circuit further comprises a second capacitor, having an end electrically connected to the first gate and the second gate of the second transistor, and another end receiving the light emitting control signal.

Optionally, the first initialization module is electrically connected to the first gate and the second gate of the second transistor.

Optionally, the first initialization module comprises a third transistor, having a gate receiving the third scan signal, a first electrode receiving the first initialization signal, and a second electrode electrically connected to a second electrode of the driving transistor.

Optionally, the light emitting control module comprises a first light emitting control unit and a second light emitting control unit. The first light emitting control unit comprises a fourth transistor. The second light emitting control unit comprises a fifth transistor. Agate of the fourth transistor and a gate of the fifth transistor both receive the light emitting control signal, a first electrode of the fourth transistor receives the first power signal, a second electrode of the fourth transistor is electrically connected to the first electrode of the driving transistor. A first electrode of the fifth transistor is electrically connected to a positive electrode of the light emitting device, and the second electrode of the fifth transistor is electrically connected to a second electrode of the driving transistor.

Optionally, the pixel circuit further comprises a second initialization module, electrically connected to a positive electrode of the light emitting control device and receiving the first scan signal and the second scan signal, configured to initialize a voltage level of the positive electrode of the light emitting device under a control of the first scan signal. The second initialization module comprises a sixth transistor, having a gate receiving the first scan signal, a first electrode electrically connected to the positive electrode of the light emitting device, and a second electrode receiving the second initialization signal.

Optionally, the pixel circuit has a first working mode and a second working mode, and a display frequency of the first working mode is greater than a display frequency of the second working mode. The first initialization signal is a DC signal in the first working mode and the first initialization signal is an AC signal in the second working mode.

According to another embodiment of the present disclosure, a pixel circuit is disclosed. The pixel circuit includes a first transistor, a driving transistor, a second transistor, a third transistor, a fourth transistor, a fifth transistor, a first capacitor, and a light emitting device. The first transistor has a gate receiving a first scan signal and a source receiving a data signal. The driving transistor includes a source electrically connected to a drain of the first transistor. The second transistor includes a first gate and a second gate receiving a second scan signal, a source electrically connected to a drain of the driving transistor, and a drain electrically connected to a gate of the driving transistor. The third transistor includes a gate receiving a third scan signal, a source receiving a first initialization signal, and a drain electrically connected to the drain of the driving transistor or a transistor node of the second transistor. The fourth transistor includes a gate receiving a light emitting control signal, a source receiving a first power signal and a drain electrically connected to the source of the transistor. The fifth transistor includes a gate receiving the light emitting control signal and a source electrically connected to the drain of the driving transistor. The first capacitor has an end electrically connected to the gate of the driving transistor, and another end receiving a first power signal. The light emitting device includes a positive electrode electrically connected to a drain of the fifth transistor, and a second electrode receiving a second power signal.

Optionally, the pixel circuit further comprises a second capacitor, having an end electrically connected to the transistor node of the second transistor, and another end receiving the light emitting control signal.

Optionally, the pixel circuit further comprises a sixth transistor, having a gate receiving the first scan signal, a source receiving a second initialization signal, and a drain connected to the positive electrode of the light emitting device.

According to an embodiment of the present disclosure, a display panel is disclosed. The display panel comprises a pixel circuit. The pixel circuit includes a first transistor, a driving transistor, a second transistor, a third transistor, a fourth transistor, a fifth transistor, a first capacitor, and a light emitting device. The first transistor has a gate receiving a first scan signal and a source receiving a data signal. The driving transistor includes a source electrically connected to a drain of the first transistor. The second transistor includes a first gate and a second gate receiving a second scan signal, a source electrically connected to a drain of the driving transistor, and a drain electrically connected to a gate of the driving transistor. The third transistor includes a gate receiving a third scan signal, a source receiving a first initialization signal, and a drain electrically connected to the drain of the driving transistor or a transistor node of the second transistor. The fourth transistor includes a gate receiving a light emitting control signal, a source receiving a first power signal and a drain electrically connected to the source of the transistor. The fifth transistor includes a gate receiving the light emitting control signal and a source electrically connected to the drain of the driving transistor. The first capacitor has an end electrically connected to the gate of the driving transistor, and another end receiving a first power signal. The light emitting device includes a positive electrode electrically connected to a drain of the fifth transistor, and a second electrode receiving a second power signal.

Optionally, the pixel circuit further comprises a second capacitor, having an end electrically connected to the transistor node of the second transistor, and another end receiving the light emitting control signal.

Optionally, the pixel circuit further comprises a sixth transistor, having a gate receiving the first scan signal, a source receiving a second initialization signal, and a drain connected to the positive electrode of the light emitting device.

According to an embodiment of the present disclosure, a pixel circuit and a display panel are disclosed. Here, the pixel circuit comprises a light emitting device, a driving transistor, a data signal write-in module, a compensation module, a first initialization module and a light emitting control module. The first initialization module is electrically connected to the compensation module and electrically connected to the gate of the driving transistor through the compensation module. When the voltage level of the gate of the driving transistor, the number of the transistors connected to the driving transistor could be reduced such that the number of leakage paths connected to the gate of the driving transistor could be reduced. This raises the voltage level stability of the driving transistor and further ensures the light emitting evenness of the light emitting device D. Accordingly, when the display panel is working under a low display frequency, the display effect in a frame period could be more even to avoid flickers.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The terminology used herein is for the purpose of describing particular embodiments only and is not intended to be limiting of the invention. As used herein, the singular forms "a", "said" and "the" are intended to include the plural forms as well, unless the context clearly indicates otherwise. It will be understood that the term "and/or," when used in this specification, specify one or more associated elements, alone or in combination, are provided. It will be further understood that the terms "first," "second," "third," and "fourth," when used in this specification, claim and drawings, are used to distinguish different objects, rather than to describe a specific order. It will be further understood that the terms "comprises" and/or "comprising," when used in this specification, specify the presence of stated features, products, steps, operations, elements, and/or components, but do not preclude the presence or addition of one or more other features, products, steps, operations, elements, components, and/or groups thereof.

The present disclosure provides a pixel circuit and a display panel as introduced in the following paragraphs.

It should be noted that the source and drain in the transistors are symmetric in the present disclosure and thus could be replaced with each other. In the following embodiments, the first electrode and the second electrode of a transistor could be a source and drain or a drain and a source.

Figure 1:
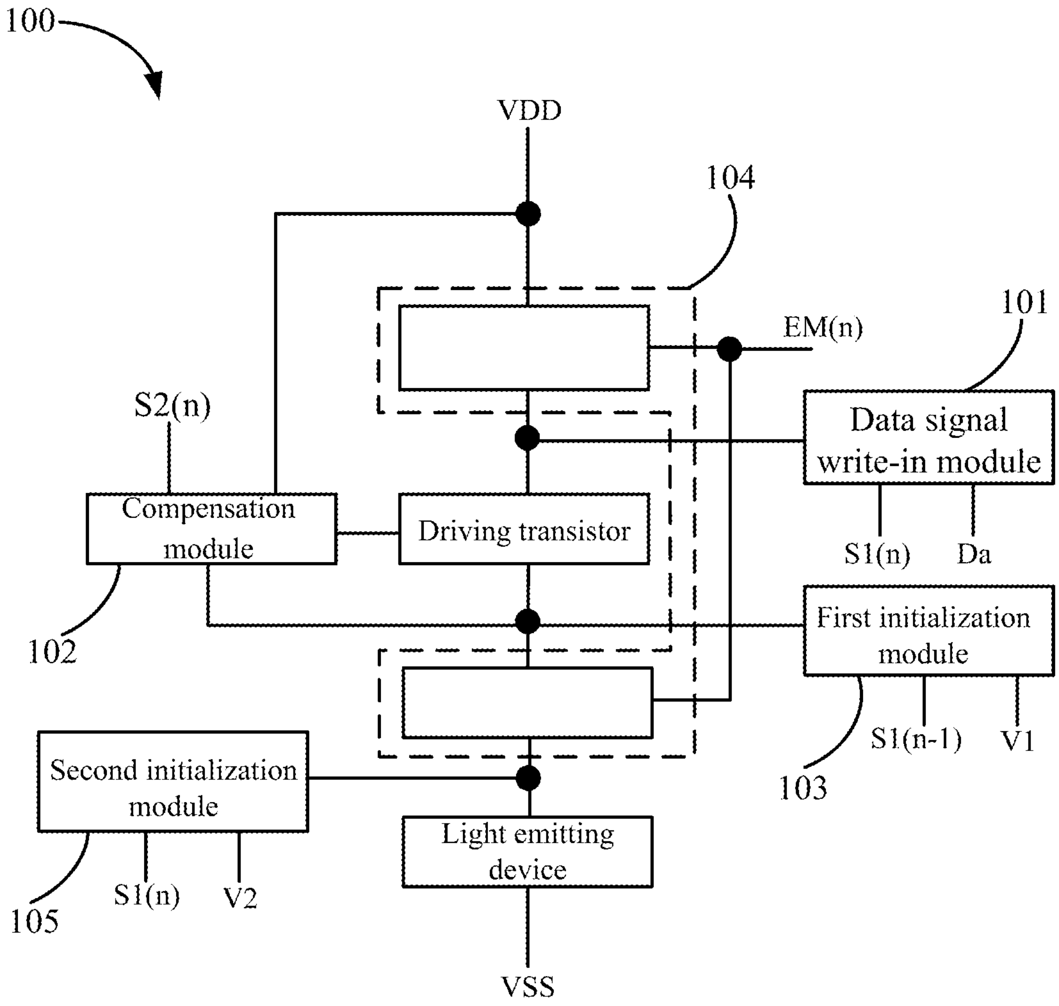
FIG. 1 is a diagram of a pixel circuit according to an embodiment of the present disclosure.

Please refer to FIG. 1. FIG. 1 is a diagram of a pixel circuit according to an embodiment of the present disclosure. A pixel circuit 100 is disclosed. The pixel circuit 100 comprises a light emitting device D, a driving transistor Td, a data signal write-in module 101, a compensation module 102, a first initialization module 103 and a light emitting module 104. It should be noted that the light emitting device D could be a mini LED, a micro LED or an OLED.

An end of the light emitting device D is electrically connected to the first power signal VDD. The other end of the light emitting device D is electrically connected to the second power signal VSS.

The data signal write-in module 101 receives the first scan signal S1(*n*) and the data signal Da and is electrically connected to the first electrode of the driving transistor Td. The data signal write-in module 101 is used to write the data signal Da into the first electrode of the driving transistor Td under the control of the first scan signal S1(*n*). That is, the data signal write-in module 101 outputs the data signal Da in response to the first scan signal S1(*n*).

The first electrode of the driving transistor Td is electrically connected to the data signal write-in module 101 to receive the data signal Da.

The compensation module 102 receives the second scan signal S2(*n*) and the first power signal VDD and is electrically connected to the second electrode and the gate of the driving transistor Td. The compensation module 102 is configured to compensate the threshold voltage of the driving transistor Td under the control of the second scan signal S2(*n*).

The first initialization module 103 receives the third scan signal S1(*n*−1) and the first initialization signal V1 and is electrically connected to the compensation module 102. The first initialization module 103 is used to initialize the voltage level of the gate of the driving transistor Td under the third scan signal S1(*n*−1) through the compensation module 102.

The light emitting control module 104 receives the light emitting control signal EM(n) and is connected in series between the first power signal VDD and the second power signal VSS. The light emitting control module 104 is used to turn on or turn off the light emitting circuit under the control of the light emitting control signal EM(n). The light emitting circuit represents the conductive paths in the pixel circuit 100 when the light emitting device D is lighten. In the present disclosure, it only needs to ensure that the light emitting control module 104 and the light emitting device D are connected in series between the first power signal VDD and the second power signal VSS. The light emitting control module 104 and the light emitting device D could be connected in series in any position between the first power signal VDD and the second power signal VSS.

In the pixel circuit 100, the first initialization module 103 is electrically connected to the compensation module 102 and is electrically connected to the gate of driving transistor Td through the compensation module 102. When the gate voltage of the driving transistor Td is initialized, the number of the transistors connected to the gate of the driving transistor Td could be reduced. In this way, the number of the leakage paths of the gate voltage of the driving transistor Td could be reduced. This could raise the stability of the voltage level of the driving transistor Td and ensure the light emitting evenness of the light emitting device D.

Figure 2:
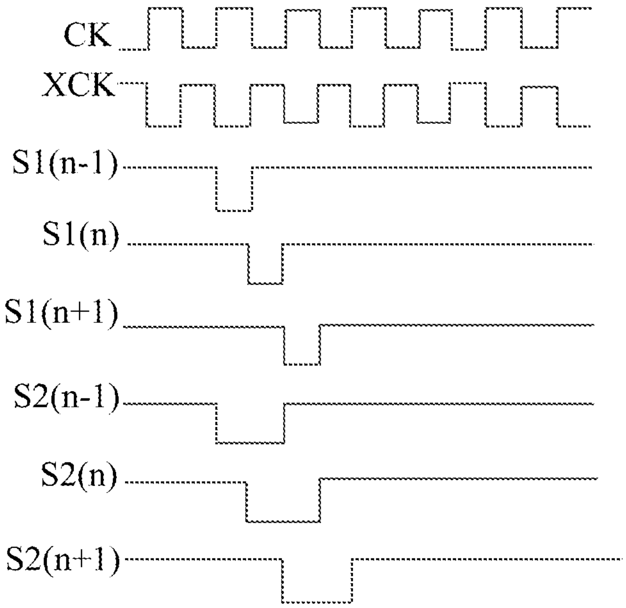
FIG. 2 is a timing diagram of a GOA driving signal corresponding to a pixel circuit according to an embodiment of the present disclosure.

Please refer to FIG. 2. FIG. 2 is a timing diagram of a GOA driving signal corresponding to a pixel circuit according to an embodiment of the present disclosure. The first clock signal CL1 and the second clock signal CK2 remain inversed. The fourth scan signal Scan1(*n*−1), the first scan signal Scan1(*n*) and the third scan signal S1(*n*−1) have the same frequency. The fifth scan signal Scan2(*n*−1), the second scan signal Scan2(*n*) and the sixth scan signal Scan2 (*n*+1) have the same frequency.

In the present disclosure, the first scan signal Scan1(*n*) and the third scan signal S1(*n*−1) are generated by a GOA (gate driver on array) circuits. The first scan signal Scan1(*n*) and the second scan signal Scan2(*n*) could be generated by two GOA circuits or one GOA circuit. Here, the GOA circuit is well known in this industry and thus further illustration is omitted here. The first signal Scan1(*n*), the second scan signal Scan2(*n*) and the third scan signal S1(*n*−1) could be set according to the actual demands.

The pixel circuit 100 further comprises a second initialization module 105. The second initialization module 105 receives the first scan signal S1(*n*) and the second initialization signal V2 and is electrically connected to the positive electrode of the light emitting device D. The second initialization module 105 is configured to initialize the voltage level of the positive electrode of the light emitting device D under the control of the first scan signal S1(*n*).

When the light emitting device D is an LED, the positive electrode of the light emitting device D could be an anode of the LED.

The present disclosure could initialize the voltage level of the positive electrode of the light emitting device D by including the second initialization module 105 in the pixel circuit 100 to prevent the remaining charges of the positive electrode of the light emitting device D from affecting the luminance of the light emitting device D.

Figure 3:
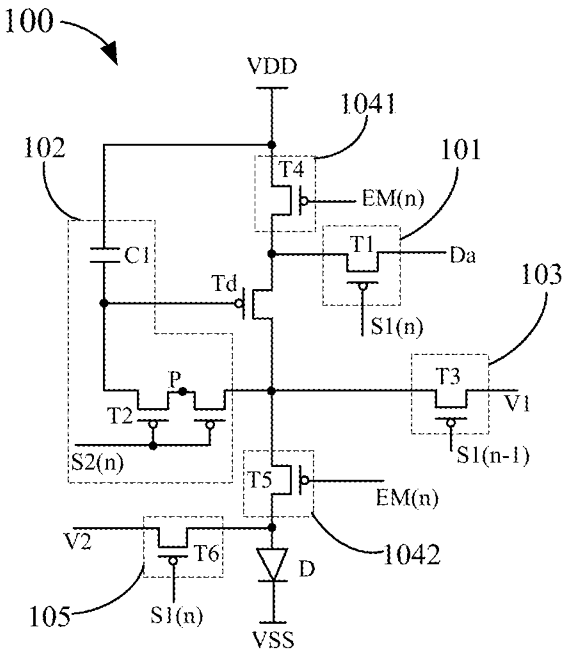
FIG. 3 is a diagram of a first circuit of a pixel circuit according to an embodiment of the present disclosure.

Please refer to FIG. 3. FIG. 3 is a diagram of a first circuit of a pixel circuit according to an embodiment of the present disclosure. The data signal write-in module 101 comprises a first transistor T1.

The gate of the first transistor T1 receives the first scan signal S1(*n*). The first electrode of the first transistor T1 receives the data signal Da. The second electrode of the first transistor T1 is electrically connected to the first electrode of the driving transistor Td. In another embodiment, the data signal write-in module 101 could be formed by multiple transistors connected in series.

The compensation module 102 comprises a second transistor T2 and a first capacitor C1. The gate of the second transistor T2 receives the second scan signal S2(*n*). The first electrode of the second transistor T2 and one end of the first capacitor C1 are both electrically connected to the gate of the driving transistor Td. The second electrode of the second transistor T2 is electrically connected to the second electrode of the driving transistor Td. The other end of the first capacitor C1 receives the first power signal VDD. In another embodiment, the compensation module 102 could be formed by multiple transistors and a capacitor connected in series.

The first initialization module 103 comprises a third transistor T3. The gate of the third transistor T3 receives the third scan signal S1(*n*−1). The first electrode of the third transistor T3 receives the first initialization signal V1. The second electrode of the third transistor T3 is electrically connected to the second electrode of the driving transistor Td. In another embodiment, the first initialization module 103 could be formed by multiple transistors connected in series.

The light emitting control module 104 comprise a first light emitting control unit 1041 and a second light emitting control unit 1042. The first light emitting control unit 1041 comprise a fourth transistor T4. The second light emitting control unit 1042 comprise a fifth transistor T5. The gate of the fourth transistor T4 and the gate of the fifth transistor T5 both receive the light emitting control signal EM(n). The first electrode of the fourth transistor T4 receives the first power signal VDD. The second electrode of the fifth transistor T5 is electrically connected to the second electrode of the driving transistor Td.

In the pixel circuit 100, the light emitting module 104 could comprise 3, 4 or more light emitting control units. Each of the light emitting control units is connected in series with the light emitting circuit. The multiple light emitting control units could receive the same light emitting control signal EM or different light emitting control signals EM. In another embodiment, each of the light emitting control unit could be formed by multiple transistors connected in series.

The second initialization module 105 comprises a sixth transistor T6. The gate of the sixth transistor T6 receives the first scan signal S1(*n*−1). The first electrode of the sixth transistor T6 is electrically connected to the positive electrode of the light emitting device D. The second electrode of the sixth transistor T6 receives the second initialization signal V2. In another embodiment, the second initialization module 105 could be formed by multiple transistors connected in series.

The pixel circuit 100 adopts 7T1C (7 transistors and 1 capacitor) structure to control the light emitting device D. It uses fewer devices, has a simple structure and reduces the cost.

The first power signal VDD and the second power signal VSS are both used to output a specific voltage value. in addition, in the present disclosure, the voltage level of the first power signal VDD is larger than the voltage level of the second power signal VSS. Specifically, the voltage level of the second power signal VSS could be a ground voltage. In another embodiment, the voltage level of the second power signal VSS could be another voltage level.

Figure 10:
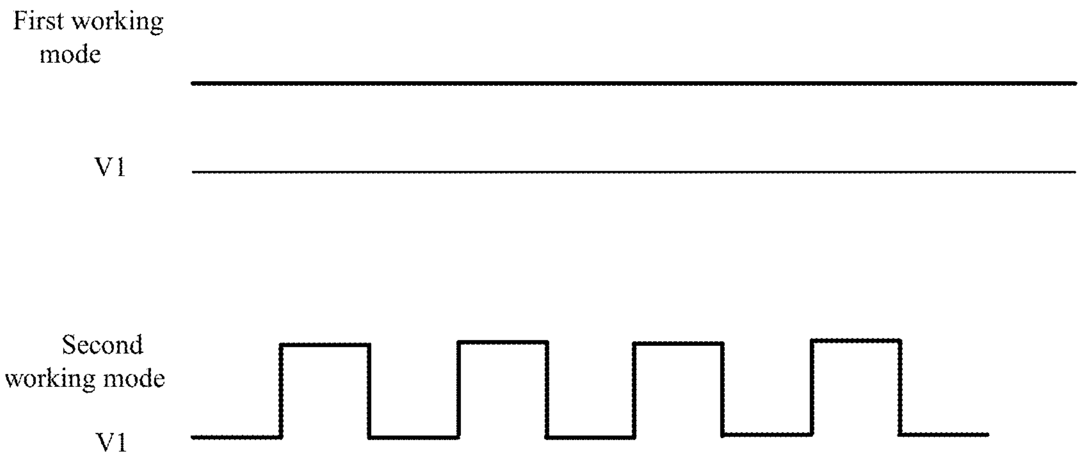
FIG. 10 is a diagram showing a first initialization signal in a first working mode and in a second working mode according to an embodiment of the present disclosure.

The pixel circuit 100 comprises a first working mode and a second working mode. The display frequency of the first working mode is greater than the display frequency of the second working mode. In the first working mode, the first initialization signal V1 is a DC signal. In the second working mode, the first initialization signal V1 is an AC signal, as shown in FIG. 10.

In a low-frequency driving, the time period of a frame period is longer. If the first initialization signal V1 is a DC signal and the same bias is applied to the driving transistor Td for a long time, the threshold voltage of the driving transistor Td shifts. In this embodiment, the first initialization signal V1 is designed as an AC signal. In this way, the second electrode of the driving transistor Td could receive the first initialization signal V1 having a changing voltage. This could prevent the threshold voltage from shifting when the driving transistor Td is biased for a long time.

The driving transistor Td, the first transistor T1, the second transistor T2, the third transistor T3, the fourth transistor T4, the fifth transistor T5 and sixth transistor T6 could be low temperature polysilicon (LTPS) thin film transistors (TFT), semiconductor oxide TFTs, amorphous TFTs or a combination of the above. In addition, the transistors in the pixel circuit 100 could be P-type transistors or N-type transistors. Furthermore, all the transistors in the pixel circuit 100 could be the same type of transistors to avoid any influences on the pixel circuit 100 introduced by the difference between the types of transistors.

In addition, because the pixel circuit 100 reduces the leakage paths of the gate voltage of the driving transistor Td, the pixel circuit 100 could effectively reduce the leakage currents. Therefore, in contrast to the conventional low temperature polycrystalline oxide technology using IGZO (Indium Gallium Zinc Oxide) transistors to solve the flicker problem in the low-frequency driving, the present disclosure could use LTPS transistors without IGZO transistors. This makes the pixel circuit 100 more simple and reduces the cost.

In the following embodiments, the driving transistor Td, the first transistor T1, the second transistor T2, the third transistor T3, the fourth transistor T4, the fifth transistor T5 and sixth transistor T6 are P-type transistors. However, this configuration is just an example, not a limitation of the present disclosure.

The second transistor T2 is a double-gate transistor. The first gate and the second gate of the second transistor T2 both receive the second scan signal S2(*n*). It could be understood that the leakage current of the double-gate transistor is lower than that of a single-gate transistor. Therefore, the leakage current of the gate of the driving transistor T2 could be further reduced by using a double-gate transistor as the second transistor T2. This could ensure the stability of the voltage level of the driving transistor Td.

Figure 4:
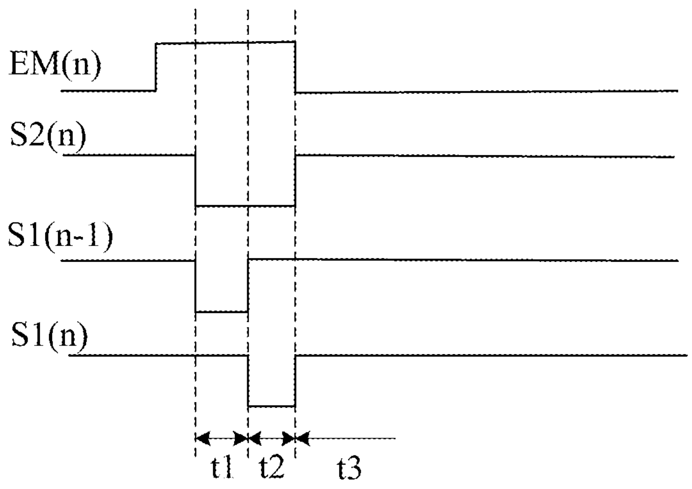
FIG. 4 is a timing diagram of the pixel circuit shown in FIG. 3.

Please refer to FIG. 4. FIG. 4 is a timing diagram of the pixel circuit shown in FIG. 3. The light emitting control signal EM, the first scan signal S1(*n*), the second scan signal S2(*n*) and the third scan signal S1(*n*−1) respectively correspond to a reset phase t1, a compensation phase t2 and a light emitting phase t3. That is, within a frame period, the driving control timing in the pixel circuit 100 comprises the reset phase t1, the compensation phase t2 and the light emitting phase t3.

In the reset phase t1, the second scan signal S2(*n*) and the third scan signal S1(*n*−1) both correspond to a low voltage level, and the first scan signal S1(*n*) and the light emitting control signal EM(n) both correspond to a high voltage level. Accordingly, the first transistor T1, the fourth transistor T4, the fifth transistor T5 and the sixth transistor T6 are all turned off. The second transistor T2 and the third transistor T3 are turned on. The first initialization signal V1 is outputted to the gate of the driving transistor Td through the first transistor T1 and the second transistor T2. The voltage level of the gate of the driving transistor Td is reset to the voltage level of the first initialization signal V1.

In the compensation phase t2, the first scan signal S1(*n*) and the second scan signal S2(*n*) correspond to a low voltage level, and the third scan signal S1(*n*-1) and the light emitting control signal EM(n) both correspond to a high voltage level. Accordingly, the third transistor T3, the fourth transistor T4 and the fifth transistor T5 are all turned off. The first transistor T1 and the second transistor T2 are turned on. The data signal Da is written into the gate of the driving transistor Td through the first transistor T1, the driving transistor Td and the second transistor T2. When the voltage level of the gate of the driving transistor Td is charged to the Vdata-Vth, the driving transistor Td is cut off and the voltage level of the gate of the driving transistor Td stops rising. The first capacitor stores the voltage level of the gate of the driving transistor Td.

At the same time, because the first scan signal S1(*n*) corresponds to a low voltage level, the sixth transistor T6 is turned on. The voltage level of the positive electrode of the light emitting device D is reset to the voltage level of the second initialization signal V2 to ensure that the sixth transistor T6 does not generate light in the compensation phase t2.

In the light emitting phase t3, the light emitting control signal EM(n) corresponds to a low voltage level, and the first scan signal S1(*n*), the second scan signal S2(*n*) and the third scan signal S1(*n*−1) correspond to a high voltage level. At this time, the first transistor T1, the second transistor T2, the third transistor T3 and the sixth transistor T6 are all turned off. The driving transistor Td, the fourth transistor T4 and the fifth transistor T5 are all turned on. The driving transistor Td generates a driving current corresponding to the data signal Da according to the gate voltage. The driving current flows to the light emitting device D through the fourth transistor T4, the driving transistor Td and the fifth transistor T5 such that the light emitting device D is driven to generate light.

Figure 5:
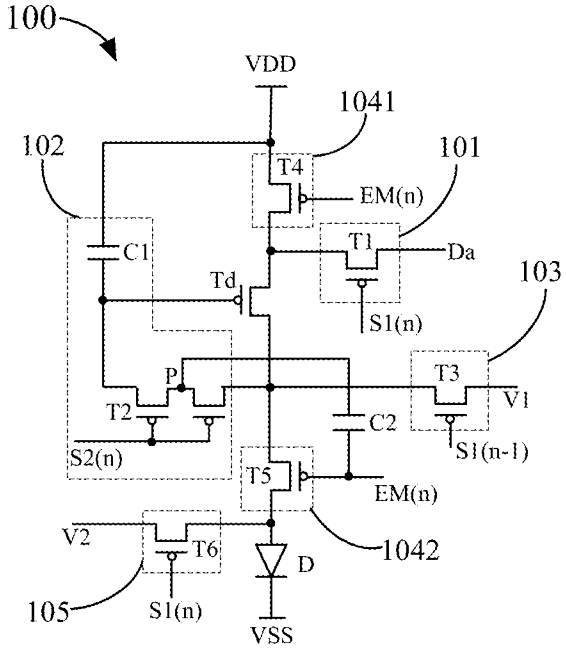
FIG. 5 is a diagram of a second circuit of a pixel circuit according to an embodiment of the present disclosure.

Please refer to FIG. 5. FIG. 5 is a diagram of a second circuit of a pixel circuit according to an embodiment of the present disclosure. The difference between the pixel circuit 100 shown in FIG. 3 and the pixel circuit shown in FIG. 5 is: in this embodiment, the pixel circuit 100 further comprises a second capacitor C2. One end of the second capacitor C2 is electrically connected to the transistor node P of the second transistor T2. The other end of the second capacitor C2 receives the light emitting control signal EM(n).

In the actual manufacturing process, the panel may have some parasite capacitors. The voltage level of the transistor node P of the second transistor T2 is coupled to a higher voltage level because of the coupling effect of the parasite capacitors. This influences the gate voltage of the driving transistor Td because of leakage currents. In this embodiment, a second capacitor C2 is further included to perform a reversed coupling on the voltage level of the transistor node P such that the voltage level of the transistor node P could be substantially consistent with the voltage level of the gate of the driving transistor Td. This could further ensure the stability of the voltage level of the gate of the driving transistor Td. The coupling process will be illustrated in the following embodiments.

In addition, the other end of the second capacitor C1 receives the light emitting control signal EM(n). This could simplify the complexity of the wires. Surely, in another embodiment, the other end of the second capacitor C2 could receive another control signal to perform the reversed coupling on the voltage level of the transistor node P of the second transistor T2.

The driving control timing of the pixel circuit 100 is the same as the driving control timing of the pixel circuit 100. That is, the driving control timings of the pixel circuit 100 comprise the reset phase t1, the compensation phase t2 and the light emitting phase t3.

The difference is: when the pixel 100 transits from the compensation phase t2 to the light emitting phase t3, the capacitor coupling occurs in the pixel circuit 100 because of the second capacitor C2.

After the data signal Da is written, the second scan signal Scan2(*n*) transits from a low voltage level to a high voltage level. The voltage level of the double-gate P will be coupled to a voltage level than the gate voltage of the driving transistor Td. In the following light emitting phase, because of the leakage of the second transistor T2, the voltage level of the gate of the driving transistor Td raises. The gate/source voltage difference Vgs of the driving transistor Td becomes lower such that the luminance of the light emitting device D gradually reduces within a frame time.

Therefore, the light emitting control signal EM(n) changes from a high voltage level to a low voltage level. Because of the coupling effect of the second capacitor C2, the voltage level of the transistor node P is pulled down. Furthermore, through setting the capacitance of the second capacitor C2, the voltage level of the transistor node P could be pulled down to the voltage level of the gate of the driving transistor Td. This could raise the stability of the voltage level of the gate of the driving transistor to avoid the variance of the luminance of the light emitting device D within a frame time.

Figure 6:
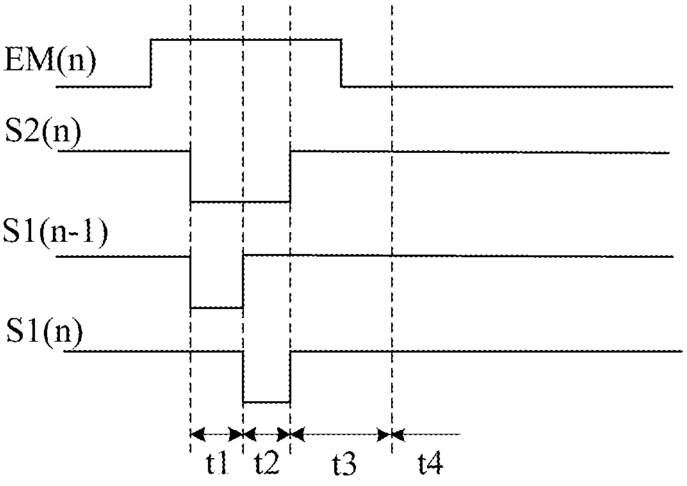
FIG. 6 is a timing diagram of the pixel circuit shown in FIG. 5.

Please refer to FIG. 6. FIG. 6 is a timing diagram of the pixel circuit shown in FIG. 5. The difference between FIG. 4 and FIG. 6 is: in this embodiment, the driving timing of the pixel circuit 100 further comprises a capacitor coupling phase t4. That is, within a frame period, the driving timing of the pixel circuit 100 comprises a reset phase t1, a compensation phase t2, a capacitor coupling phase t4 and a light emitting phase t3.

The operations of the pixel circuit 100 in the reset phase t1 and the compensation phase t2 could be referred to the above embodiments and further illustrations are omitted here.

In the capacitor coupling phase t4, the first scan signal S1(*n*), the second scan signal S2(*n*) and the third scan signal S1(*n*−1) correspond to a high voltage level. The light emitting control signal EM(n) changes from a high voltage level to a low voltage level. At this time, the first transistor T1, the second transistor T2, the third transistor T3 and the fourth transistor T4 are all turned off. The fifth transistor T5 and the sixth transistor T6 are being turned on from an off state.

After the data signal Da is written, the second scan signal Scan2(*n*) transits from a low voltage level to a high voltage level. The voltage level of the transistor node P is coupled to a voltage level higher than the gate voltage of the driving transistor Td. In the following light emitting phase, because of the leakage of the second transistor T2, the gate voltage of the driving transistor Td raises. The gate/source voltage difference Vgs of the driving transistor Td becomes lower such that the luminance of the light emitting device D gradually reduces within a frame period.

Therefore, in the capacitor coupling phase t4, the light emitting control signal EM(n) transits from a high voltage level to a low voltage level. Because of the coupling effect of the second capacitor C2, the voltage level of the transistor node P is pulled down. Furthermore, through setting the capacitance of the second capacitor C2, the voltage level of the transistor node P is pulled down to the gate voltage of the gate of the driving transistor Td. In this way, the stability of the voltage level of the gate of the driving transistor Td is raised to prevent the luminance of the light emitting device D from changing within a frame period.

In the capacitor coupling phase t4, after the light emitting control signal EM(n) changes from a high voltage level to a low voltage level, the light emitting device D generates light. However, because the time period of the capacitor coupling phase t4 is short, this does not affect the luminance of the light emitting device D.

In the light emitting phase t3, the light emitting control signal EM(n) corresponds to a low voltage level, the first scan signal S1(*n*), the second scan signal S2(*n*) and the third scan signal S3($n$−1) correspond to a high voltage level. At this time, the first transistor T1, the second transistor T2, the third transistor T3 and the sixth transistor T6 are all turned off. The driving transistor Td, the fourth transistor T4 and the fifth transistor T5 are all turned on. The driving transistor Td generates a driving current corresponding to the data signal Da according to the gate voltage. The driving current flows to the light emitting device D through the fourth transistor T4, the driving transistor Td and the fifth transistor T5 such that the light emitting device D generates light.

Figure 7:
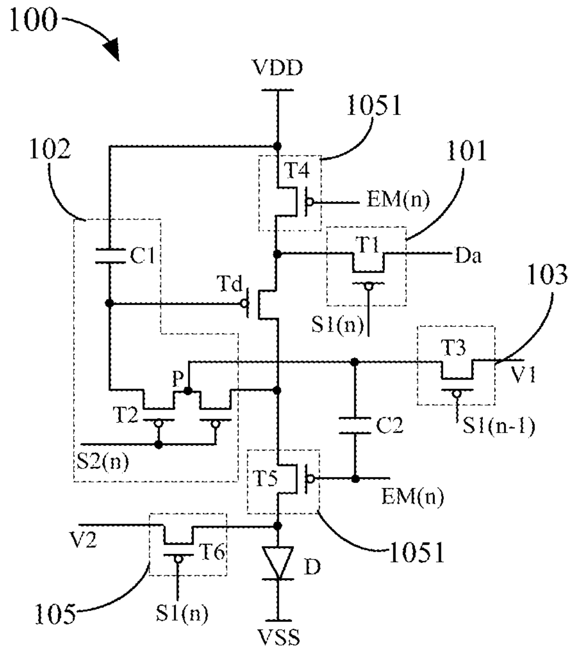
FIG. 7 is a diagram of a second circuit of a pixel circuit according to an embodiment of the present disclosure.

Please refer to FIG. 7. FIG. 7 is a diagram of a second circuit of a pixel circuit according to an embodiment of the present disclosure. The difference between FIG. 5 and FIG. 7 is: in this embodiment, the second electrode of the third transistor T3 is electrically connected to the transistor node P. That is, the second electrode of the third transistor T3 is electrically connected to the second electrode of the driving transistor Td through the transistor node P. The other configuration and the operations could be referred to the above embodiments and thus further illustrations are omitted here.

Please refer to FIG. 7. The pixel circuit 100 comprises a first transistor T1, a driving transistor Td, a second transistor T2, a third transistor T3, a fourth transistor T4, a fifth transistor T5, a first capacitor C1 and a light emitting device D.

Here, the first transistor T1 comprises a gate receiving the first scan signal S1($n$) and a source receiving a data signal Da. The source of the driving transistor Td is electrically connected to the drain of the first transistor T1. The second transistor T2 is a double-gate transistor. The second transistor T2 comprises a first gate and a second gate receiving the second scan signal S2($n$), a source electrically connected to the drain of the driving transistor Td, and a drain electrically connected to the gate of the driving transistor Td. The third transistor T3 comprises a gate receiving the third scan signal S1($n$−1), a source receiving the first initialization signal V1, and a drain electrically connected to the drain of the driving transistor Td or the transistor node P of the second transistor T2. The fourth transistor T4 comprises a gate receiving the light emitting control signal EM(n), a source receiving the first power signal VDD, and a drain electrically connected to the source of the driving transistor Td. The fifth transistor T5 comprises a gate receiving the light emitting control signal EM(n) and a source electrically connected to the drain of the driving transistor Td. One end of the first capacitor C1 is electrically connected to the gate of the driving transistor Td. The other end of the first capacitor C1 receives the first power signal VDD. The positive electrode of the light emitting device D is electrically connected to the drain of the fifth transistor T5. The second electrode of the light emitting device D receives the second power signal VSS.

In this embodiment, as a first aspect, the third transistor T3 is configured to be electrically connected to the drain of the driving transistor Td or the transistor node P of the second transistor T2. Therefore, the second transistor T2 could be used to initialize the gate voltage of the driving transistor Td and thus the number of transistors connected to the gate of the driving transistor Td could be reduced. In this way, the leakage paths of the gate voltage of the driving transistor Td could be reduced and the stability of the voltage level of the gate of the driving transistor Td could be raised. As a second aspect, the second transistor T2 is a double-gate transistor. This could further reduce the leakage current of the gate of the driving transistor Td and ensure that the stability of the voltage level of the gate of the driving transistor Td.

In addition, the pixel circuit 100 further comprises a second capacitor C2. One end of the second capacitor C2 is electrically connected to the transistor node P of the second transistor T2. The other end of the second capacitor C2 receives the light emitting control signal EM(n). In this embodiment, the second capacitor C2 is included to perform a reversed coupling on the voltage level of the transistor node P such that the voltage level of the transistor node P could be substantially consistent with the voltage level of the gate of the driving transistor Td. Accordingly, the stability of the voltage level of the gate of the driving transistor Td could be ensured.

Furthermore, the pixel circuit 100 further comprises a sixth transistor T6. The sixth transistor T6 comprises a gate receiving the first scan signal S1($n$), a drain electrically connected to the light emitting device D, and a source receiving the second initialization signal V2. In this embodiment, the sixth transistor T6 is used to initialize the voltage level of the positive electrode of the light emitting device D to prevent the remaining charges on the positive electrode of the light emitting device D from influencing the luminance of the light emitting device D.

Figure 8:
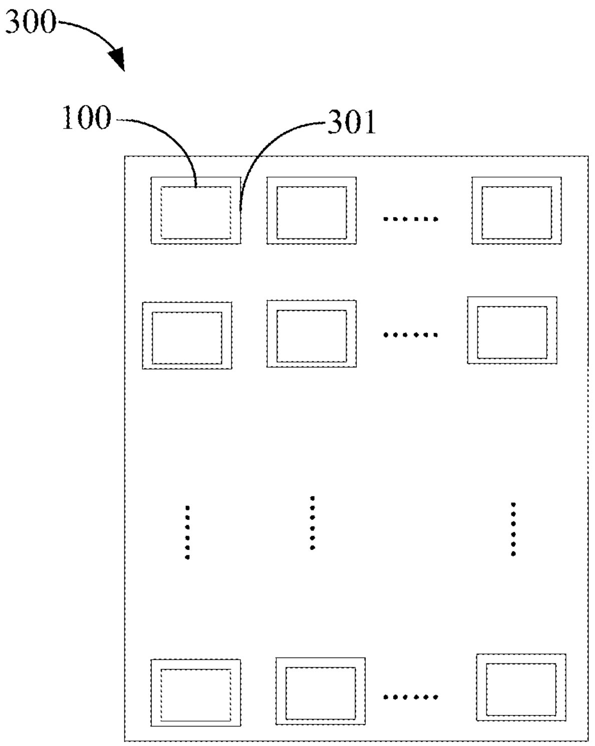
FIG. 8 is a diagram of a display panel according to an embodiment of the present disclosure.

Please refer to FIG. 8. FIG. 8 is a diagram of a display panel according to an embodiment of the present disclosure. In this embodiment, a display panel 300 is provided. The display panel 300 comprises a plurality of pixel units 301 arranged in an array. Each of the pixel units 301 comprises the above-mentioned pixel circuit 100. The pixel circuit 100 has been disclosed in the above embodiments and thus further illustrations are omitted here.

In this embodiment, the display panel 300 could be an active-matrix organic light emitting diode (AMOLED) display panel.

Figure 9:
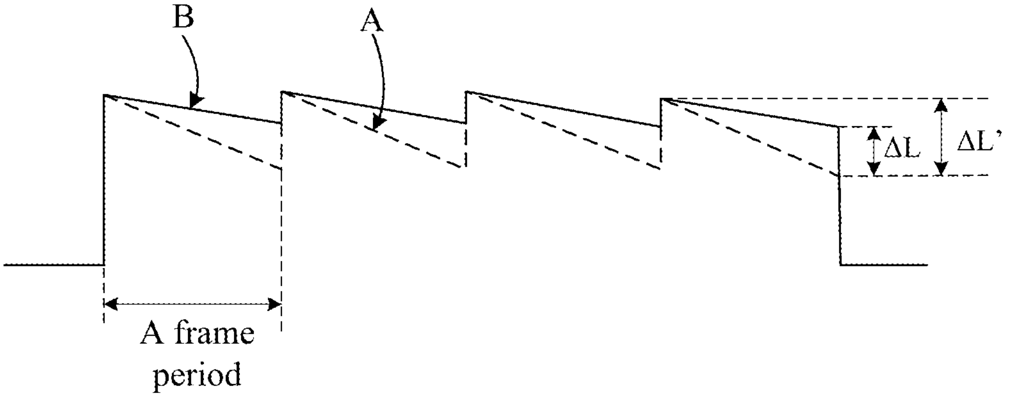
FIG. 9 is a diagram showing luminance variances according to an embodiment of the present disclosure.

Specifically, please refer to FIG. 9. FIG. 9 is a diagram showing luminance variances according to an embodiment of the present disclosure. Here, the curve A represents a variance trend of the luminance of the display panel 300 within a frame period when the first initialization module is configured to be electrically connected to the driving transistor according to the conventional art. The curve B represents a variance trend of the luminance of the display panel 300 within a frame period according to the present disclosure.

From FIG. 9, it could be seen that the luminance variance of the display panel 300 within a frame period according to the conventional art is ΔL'. In contrast, the luminance variance of the display panel 300 within a frame period according to the present disclosure is ΔL. Apparently, the luminance of the display panel 300 within a frame period according to the present disclosure is more uniform.

In the display panel 300 according an embodiment of the present disclosure, a novel pixel circuit 100 is designed. In the pixel circuit 100, the first initialization module is indirectly electrically connected to the gate of the driving transistor. in this way, at the same time of initializing the gate voltage of the driving transistor, the number of the transistors connected to the gate of the driving transistor could be reduced. Accordingly, when the display panel 300 is working at a low display frequency, the display quality within a frame period could be more uniform and the flicker issues could be alleviated.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A pixel circuit, comprising:

a light emitting device, having two ends electrically connected to a first power signal and a second power signal;

a data signal write-in module, configured to output a data signal in response to a first scan signal;

a driving transistor, having a first electrode electrically connected to the data signal write-in module;

a compensation module, electrically connected to a second electrode of the driving transistor and a gate of the driving transistor, configured to receive a second scan signal and the first power signal;

a first initialization module, electrically connected to the compensation module, configured to receive a third scan signal and a first initialization signal; and a light emitting control module, connected in series between the first power signal and the second power signal, configured to receive a light emitting control signal;

wherein the pixel circuit has a first working mode and a second working mode, and a display frequency of the first working mode is greater than a display frequency of the second working mode; and wherein the first initialization signal is a DC signal in the first working mode and the first initialization signal is an AC signal in the second working mode.

2. The pixel circuit of claim 1, wherein the data signal write-in module comprises a first transistor, having a gate receiving the first scan signal, a first electrode receiving the data signal, and a second electrode electrically connected to the first electrode of the driving transistor.

3. The pixel circuit of claim 1, wherein the compensation module comprises:

a first capacitor, having two ends electrically connected to the gate of the driving transistor and the first power signal; and a second transistor, having a gate receiving the second scan signal, a first electrode electrically connected to the gate of the driving transistor, and a second electrode electrically connected to the driving transistor.

4. The pixel circuit of claim 3, wherein the first initialization module is electrically connected to the second electrode of the driving transistor.

5. The pixel circuit of claim 3, wherein the second transistor is a double-gate transistor, having a first gate and a second gate both receiving the second scan signal.

6. The pixel circuit of claim 5, further comprising:

a second capacitor, having an end electrically connected to a transistor node of the second transistor, and another end receiving the light emitting control signal.

7. The pixel circuit of claim 5, wherein the first initialization module is electrically connected to the second electrode of the second transistor.

8. The pixel circuit of claim 1, wherein the first initialization module comprises a third transistor, having a gate receiving the third scan signal, a first electrode receiving the first initialization signal, and a second electrode electrically connected to the second electrode of the driving transistor.

9. The pixel circuit of claim 1, wherein the light emitting control module comprises a first light emitting control unit and a second light emitting control unit; the first light emitting control unit comprises a fourth transistor; and the second light emitting control unit comprises a fifth transistor;

wherein a gate of the fourth transistor and a gate of the fifth transistor both receive the light emitting control signal, a first electrode of the fourth transistor receives the first power signal, a second electrode of the fourth transistor is electrically connected to the first electrode of the driving transistor; a first electrode of the fifth transistor is electrically connected to a positive electrode of the light emitting device, and the second electrode of the fifth transistor is electrically connected to the second electrode of the driving transistor.

10. The pixel circuit of claim 1, further comprising:

a second initialization module, electrically connected to a positive electrode of the light emitting control device and receiving the first scan signal, configured to initialize a voltage level of the positive electrode of the light emitting device under a control of the first scan signal;

wherein the second initialization module comprises a sixth transistor, having a gate receiving the first scan signal, a first electrode electrically connected to the positive electrode of the light emitting device, and a second electrode receiving the second initialization signal.

11. A pixel circuit, comprising:

a first transistor, having a gate receiving a first scan signal and a source receiving a data signal;

a driving transistor, having a source electrically connected to a drain of the first transistor;

a second transistor, having a first gate and a second gate receiving a second scan signal, a source electrically connected to a drain of the driving transistor, and a drain electrically connected to a gate of the driving transistor;

a third transistor, having a gate receiving a third scan signal, a source receiving a first initialization signal, and a drain electrically connected to the drain of the second transistor;

a fourth transistor, having a gate receiving a light emitting control signal, a source receiving a first power signal and a drain electrically connected to the source of the driving transistor;

a fifth transistor, having a gate receiving the light emitting control signal and a source electrically connected to the drain of the driving transistor;

a first capacitor, having an end electrically connected to the gate of the driving transistor, and another end receiving a first power signal; and a light emitting device, having a positive electrode electrically connected to a drain of the fifth transistor, and a second electrode receiving a second power signal;

wherein the pixel circuit has a first working mode and a second working mode, and a display frequency of the first working mode is greater than a display frequency of the second working mode; and wherein the first initialization signal is a DC signal in the first working mode and the first initialization signal is an AC signal in the second working mode.

12. The pixel circuit of claim 11, further comprising:

a second capacitor, having an end electrically connected to a transistor node of the second transistor, and another end receiving the light emitting control signal.

13. The pixel circuit of claim 12, further comprising:

a sixth transistor, having a gate receiving the first scan signal, a source receiving a second initialization signal, and a drain connected to the positive electrode of the light emitting device.

14. A display panel, comprising a plurality of pixel units arranged in an array, each of the pixel units comprising a pixel circuit, the pixel circuit comprising:

a first transistor, having a gate receiving a first scan signal and a source receiving a data signal;

a driving transistor, having a source electrically connected to a drain of the first transistor;

a second transistor, having a first gate and a second gate receiving a second scan signal, a source electrically connected to a drain of the driving transistor, and a drain electrically connected to a gate of the driving transistor;

a third transistor, having a gate receiving a third scan signal, a source receiving a first initialization signal, and a drain electrically connected to the drain of the second transistor;

a fourth transistor, having a gate receiving a light emitting control signal, a source receiving a first power signal and a drain electrically connected to the source of the driving transistor;

a fifth transistor, having a gate receiving the light emitting control signal and a source electrically connected to the drain of the driving transistor;

a first capacitor, having an end electrically connected to the gate of the driving transistor, and another end receiving a first power signal; and a light emitting device, having a positive electrode electrically connected to a drain of the fifth transistor, and a second electrode receiving a second power signal;

wherein the pixel circuit has a first working mode and a second working mode, and a display frequency of the first working mode is greater than a display frequency of the second working mode; and wherein the first initialization signal is a DC signal in the first working mode and the first initialization signal is an AC signal in the second working mode.

15. The display panel of claim 14, wherein the pixel circuit further comprises:

a second capacitor, having an end electrically connected to a transistor node of the second transistor, and another end receiving the light emitting control signal.

16. The display panel of claim 15, wherein the pixel circuit further comprises:

a sixth transistor, having a gate receiving the first scan signal, a source receiving a second initialization signal, and a drain connected to the positive electrode of the light emitting device.

* * * * *